US012812716B2

(12) United States Patent
Spapis et al.

(10) Patent No.: US 12,812,716 B2
(45) Date of Patent: Nov. 24, 2026

(54) BEAM FAILURE RECOVERY

(71) Applicant: Nokia Technologies Oy, Espoo (FI)

(72) Inventors: Panagiotis Spapis, Munich (DE); Srinivasan Selvaganapathy, Bangalore (IN); Sanjay Goyal, Denville, NJ (US); Umur Karabulut, Munich (DE)

(73) Assignee: Nokia Technologies Oy, Espoo (FI)

( * ) Notice: Subject to any disclaimer, the term of this patent is extended or adjusted under 35 U.S.C. 154(b) by 276 days.

(21) Appl. No.: 18/797,395

(22) Filed: Aug. 7, 2024

(65) Prior Publication Data

US 2025/0056645 A1 Feb. 13, 2025

(30) Foreign Application Priority Data

Aug. 10, 2023 (IN) ............................ 202341053796

(51) Int. Cl.
*H04W 76/19* (2018.01)
*H04B 7/06* (2006.01)
*H04W 72/044* (2023.01)

(52) U.S. Cl.
CPC .......... *H04W 76/19* (2018.02); *H04B 7/0695* (2013.01); *H04W 72/046* (2013.01)

(58) Field of Classification Search
CPC ... H04W 76/19; H04W 72/046; H04B 7/0695
See application file for complete search history.

(56) References Cited

U.S. PATENT DOCUMENTS

2025/0008391 A1* 1/2025 Kim .................. H04W 36/0077
2026/0025875 A1* 1/2026 Abdul Latheef . H04W 56/0045
2026/0107203 A1* 4/2026 Teyeb ................ H04B 7/06964

FOREIGN PATENT DOCUMENTS

WO 2024/027976 A1 2/2024

OTHER PUBLICATIONS

"3rd Generation Partnership Project, Technical Specification Group Radio Access Network; NR; Radio Resource Control (RRC) protocol specification (Release 17)", 3GPP TS 38.331 V17.5.0. Jun. 2023, pp. 1-1328.
"3rd Generation Partnership Project; Technical Specification Group Radio Access Network; NR; NR and NG-RAN Overall Description; Stage 2 (Release 17)", 3GPP TS 38.300 TS 38.300 V17.5.0. Jun. 2023, pp. 1-211.
"3rd Generation Partnership Project; Technical Specification Group Radio Access Network; NR; Medium Access Control (MAC) protocol specification (Release 17)", 3GPP TS 38.321 V17.5.0. Jun. 2023, pp. 1-253.
"IEEE 802.11", Wikipedia, Retrieved on Jul. 10, 2025, Webpage available at: https://en.wikipedia.org/wiki/IEEE_802.11.

* cited by examiner

*Primary Examiner* — Derrick V Rose
(74) *Attorney, Agent, or Firm* — Barta Jones, PLLC

(57) ABSTRACT

Exemplary embodiments of the present disclosure relate to a beam failure recovery to a cell. In an aspect, a first network device determines a radio resource control (RRC) reconfiguration for one or more cells prepared by the first network device. The RRC reconfiguration comprises a beam failure recovery configuration to be used by a terminal device for performing a beam failure recovery to the one or more cells. The first network device transmits, to a second network device, the RRC reconfiguration. By this process, the UE may recover to a non-serving cell in case of detecting a beam failure.

20 Claims, 5 Drawing Sheets

BEAM FAILURE RECOVERY

FIELD

Various example embodiments relate to the field of communication and in particular, to a terminal device, network devices, methods, apparatuses and a computer readable storage medium for a beam failure recovery, especially, to a non-serving cell.

BACKGROUND

According to the latest 3GPP agreements, a layer 1 (L1)/layer 2 (L2) triggered mobility (LTM) is split in four phases: a preparation phase, during which a serving central unit (CU) identifies target cells based on a layer 3 (L3) measurement reports, prepares the target cells and shares target cell configurations with user equipment (UE); an early synchronization phase, during which a serving distribution unit (DU) asks the UE to perform a timing advance (TA) acquisition for a specific target cell through considering L1 measurements; an execution phase, during which the serving DU decides on the target cell and asks the UE to switch to the target cell, and the UE switches to the target cell and starts receiving data from the target cell; a completion phase, during which the UE context is released from the prepared cells.

An inter cell beam management has been introduced in Rel. 17 and enables the UE to be served by a beam of a neighboring cell, without changing the serving cell. This means that the UE will continue having its context in the serving cell and the UE will listen to the broadcast (e.g., cell specific common) channels of the serving cell, but the data (e.g., UE specific channels/signals) will be provided to the UE from a borrowed beam from a non-serving cell. However, both the LTM and inter cell beam management (ICBM) still involve the following challenges: in case of beam failure, the UE is allowed to recover only in the serving cell, even if there is another better beam in a non-serving cell, and the beam failure resources are configured separately for the serving cell and the assisting cell resulting in resource waste.

SUMMARY

In general, exemplary embodiments of the present disclosure provide a solution for performing a beam failure recovery, for example, to a non-serving cell.

In a first aspect, there is provided a first network device. The first network device may include: at least one processor and at least one memory storing instructions that, when executed by the at least one processor, cause the first network device at least to: determine a radio resource control (RRC) reconfiguration for one or more cells prepared by the first network device, wherein the RRC reconfiguration comprises a beam failure recovery configuration to be used by a terminal device for performing a beam failure recovery to the one or more cells; and transmit, to a second network device, the RRC reconfiguration.

In a second aspect, there is provided a second network device. The second network device may include: at least one processor and at least one memory storing instructions that, when executed by the at least one processor, cause the second network device at least to: receive, from a first network device, a radio resource control (RRC) reconfiguration for one or more cells prepared by the first network device, wherein the RRC reconfiguration comprises a beam failure recovery configuration to be used by a terminal device for performing a beam failure recovery to the one or more cells; and transmit, to the terminal device, the RRC reconfiguration.

In a third aspect, there is provided a terminal device. The terminal device may include: at least one processor; and at least one memory storing instructions that, when executed by the at least one processor, cause the terminal device at least to: receive, from a second network device, a radio resource control (RRC) reconfiguration for one or more cells prepared by a first network device, wherein the RRC reconfiguration comprises a beam failure recovery configuration; and perform, based on the beam failure recovery configuration, a beam failure recovery to the one or more cells.

In a fourth aspect, there is provided a method. The method may include: determining, at a first network device, a radio resource control (RRC) reconfiguration for one or more cells prepared by the first network device, wherein the RRC reconfiguration comprises a beam failure recovery configuration to be used by a terminal device for performing a beam failure recovery to the one or more cells; and transmitting, to a second network device, the RRC reconfiguration.

In a fifth aspect, there is provided a method. The method may include: receiving, at a second network device and from a first network device, a radio resource control (RRC) reconfiguration for one or more cells prepared by the first network device, wherein the RRC reconfiguration comprises a beam failure recovery configuration to be used by a terminal device for performing a beam failure recovery to the one or more cells; and transmitting, to the terminal device, the RRC reconfiguration.

In a sixth aspect, there is provided a method. The method may include: receiving, at a terminal device and from a second network device, a radio resource control (RRC) reconfiguration for one or more cells prepared by a first network device, wherein the RRC reconfiguration comprises a beam failure recovery configuration; and performing, based on the beam failure recovery configuration, a beam failure recovery to the one or more cells.

In a seventh aspect, there is provided an apparatus. The apparatus may include: means for determining, at a first network device, a radio resource control (RRC) reconfiguration for one or more cells prepared by the first network device, wherein the RRC reconfiguration comprises a beam failure recovery configuration to be used by a terminal device for performing a beam failure recovery to the one or more cells; and means for transmitting, to a second network device, the RRC reconfiguration.

In an eighth aspect, there is provided an apparatus. The apparatus may include: means for receiving, at a second network device and from a first network device, a radio resource control (RRC) reconfiguration for one or more cells prepared by the first network device, wherein the RRC reconfiguration comprises a beam failure recovery configuration to be used by a terminal device for performing a beam failure recovery to the one or more cells; and means for transmitting, to the terminal device, the RRC reconfiguration.

In a ninth aspect, there is provided an apparatus. The apparatus may include: means for receiving, at a terminal device and from a second network device, a radio resource control (RRC) reconfiguration for one or more cells prepared by a first network device, wherein the RRC reconfiguration comprises a beam failure recovery configuration; and means for performing, based on the beam failure recovery configuration, a beam failure recovery to the one or more cells.

In a tenth aspect, there is provided a non-transitory computer readable medium including program instructions for causing an apparatus to perform at least the method according to any of fourth or sixth aspects.

In an eleventh aspect, there is provided a computer program including instructions, which, when executed by an apparatus, cause the apparatus at least to: determine a radio resource control (RRC) reconfiguration for one or more cells prepared by the first network device, wherein the RRC reconfiguration comprises a beam failure recovery configuration to be used by a terminal device for performing a beam failure recovery to the one or more cells; and transmit, to a second network device, the RRC reconfiguration.

In a twelfth aspect, there is provided a computer program including instructions, which, when executed by an apparatus, cause the apparatus at least to: receive, from a first network device, a radio resource control (RRC) reconfiguration for one or more cells prepared by the first network device, wherein the RRC reconfiguration comprises a beam failure recovery configuration to be used by a terminal device for performing a beam failure recovery to the one or more cells; and transmit, to the terminal device, the RRC reconfiguration.

In a thirteenth aspect, there is provided a computer program including instructions, which, when executed by an apparatus, cause the apparatus at least to: receive, from a second network device, a radio resource control (RRC) reconfiguration for one or more cells prepared by a first network device, wherein the RRC reconfiguration comprises a beam failure recovery configuration; and perform, based on the beam failure recovery configuration, a beam failure recovery to the one or more cells.

In a fourteenth aspect, there is provided a first network device. The first network device may include: a determining circuitry for determining, at a first network device, a radio resource control (RRC) reconfiguration for one or more cells prepared by the first network device, wherein the RRC reconfiguration comprises a beam failure recovery configuration to be used by a terminal device for performing a beam failure recovery to the one or more cells; and a transmitting circuitry for transmitting, to a second network device, the RRC reconfiguration.

In a fifteenth aspect, there is provided a second network device. The second network device may include: a receiving circuitry for receiving, at a second network device and from a first network device, a radio resource control (RRC) reconfiguration for one or more cells prepared by the first network device, wherein the RRC reconfiguration comprises a beam failure recovery configuration to be used by a terminal device for performing a beam failure recovery to the one or more cells; and a transmitting circuitry for transmitting, to the terminal device, the RRC reconfiguration.

In a sixteenth aspect, there is provided a terminal device. The terminal device may include: a receiving circuitry for receiving, at a terminal device and from a second network device, a radio resource control (RRC) reconfiguration for one or more cells prepared by a first network device, wherein the RRC reconfiguration comprises a beam failure recovery configuration; and a performing circuitry for performing, based on the beam failure recovery configuration, a beam failure recovery to the one or more cells.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some exemplary embodiments will now be described with reference to the accompanying drawings, in which.

Throughout the drawings, the same or similar reference numerals represent the same or similar elements.

DETAILED DESCRIPTION

Figure 1:
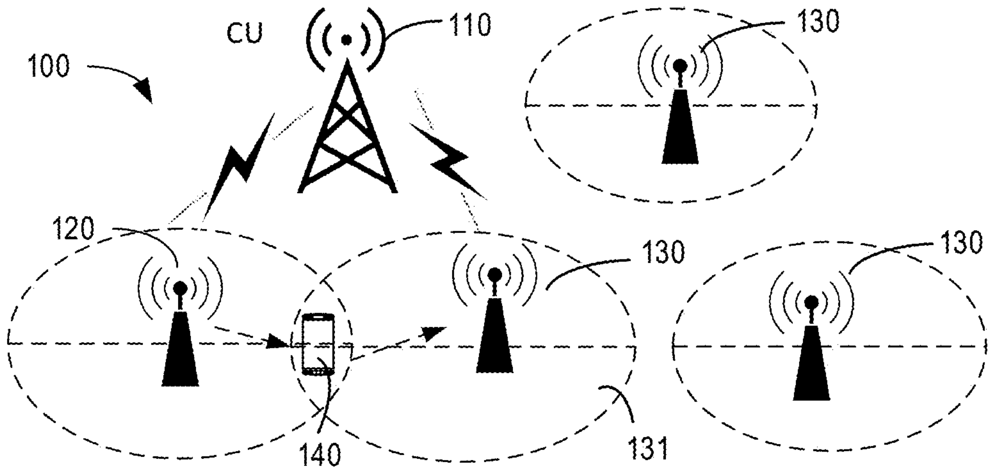
FIG. 1 illustrates a communication environment in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, according to the latest 3GPP agreements, a layer 1 (L1)/layer 2 (L2) triggered mobility (LTM) is split in four phases: a preparation phase, during which a serving central unit (CU) identifies target cells based on a layer 3 (L3) measurement reports, prepares the target cells and shares target cell configurations with user equipment (UE); an early synchronization phase, during which a serving distribution unit (DU) asks the UE to perform a timing advance (TA) acquisition for a specific target cell through considering L1 measurements; an execution phase, during which the serving DU decides on the target cell and asks the UE to switch to the target cell, and the UE switches to the target cell and starts receiving data from the target cell; a completion phase, during which the UE context is released from the prepared cells (This is optional and the UE context may be kept in case of Dynamic Switching, which is up to the CU on how long the UE context will be maintained).

In case of a beam failure, the UE is expected to recover to the serving cell, even though the UE has the configurations of multiple cells (i.e., target cell configurations) that have been provided early (during the preparation phase).

In Rel. 17, Inter Cell Beam Management (ICBM) has been introduced and enables the UE to be served by a beam of a neighboring cell, without changing the serving cell. This means that the UE will continue having its context in the serving cell and the UE will listen to the broadcast (e.g., cell specific common) channels of the serving cell, but the data (e.g., UE specific channels/signals) will be provided to the UE from a borrowed beam from a non-serving cell.

In ICBM, the UE is configured, based on L3 measurement reports, with beams from the assisting cells. The ICBM configurations are provided to the UE in RRC. Then the serving cell, based on L1 measurements, may select the assisting cell and a beam of the assisting cell and initiate serving the UE though an assisting (non-serving, neighboring) cell. It should be noted that, till Rel. 18, ICBM is strictly intra DU concept. It should also be noted that in the context of this disclosure the terms non-serving and assisting are used interchangeably.

Furthermore, in the current 3GPP NR specifications, i.e., Rel 15, a beam failure is identified by counting beam failure instance (BFI) indication from the lower layers to the MAC entity. If a BFI is not identified for a certain amount of time (i.e., Beam Failure Detection Timer), the BFI counter will be reset. In case the BFI counter reaches a maximum number, configured in RRC, the UE will declare a Beam Failure and it will start the process of Beam Failure Recovery (see [TS 38.321 section 5.17]); in this case it will perform new beam search and it will identify the best beam from the serving cell to recover.

In case the BFR procedure fails, the UE will declare a Radio Link Failure (RLF) and it will start searching candidate beams for connection re-establishment. These beams may come from the serving or a non-serving cell. However, declaring RLF and initiating connection re-establishment increases the interruption time.

The resources to perform BFR are configured to the UE in RRC. The beams to perform BFR are configured in the BFR-SSB-Resource or in the BFR-CSIRS-Resource, where specific RACH resources are allocated to enable the UE to access the configured beams. If no specific RACH resources are allocated, then the UE will perform contention based access using the recovery beam.

Therefore, in the LTM framework and in the ICBM framework, there still exists following challenges: in case of beam failure, the UE is allowed to recover only in the serving cell, even if there is another better beam in a non-serving cell, and the beam failure resources are configured separately for the serving cell and the assisting cell resulting in resource waste.

In view of the above, some embodiments of this disclosure proposes a solution for performing beam recovery failure to a cell, for example, a non-serving cell. In this solution, the first network device determines a radio resource control (RRC) reconfiguration for one or more cells prepared by the first network device, wherein the RRC reconfiguration comprises a beam failure recovery configuration to be used by a terminal device for performing a beam failure recovery to the one or more cells. Then the first network device transmits, to a second network device, the RRC reconfiguration.

With the embodiments, the UE which is configured with ICBM and BFR to a non-serving cell will listen to dedicated channels from an assisting cell and to broadcast channels from a serving cell in case of detecting a beam failure, and the UE which is configured with LTM and BFR to a non-serving cell will change to a target cell in case of detecting a beam failure so that the UE listens only channels from the target cell.

Principles and embodiments of the present disclosure will be described in detail below with reference to the accompanying drawings. Reference is first made to FIG. 1, which illustrates an example communication system 100 in which embodiments of the present disclosure may be implemented.

As shown in FIG. 1, the system 100 comprises a CU 110 (which is a network device, and also referred to as a first network device), a source DU 120 (which is a network device, and also referred to as a second network device), and a plurality of candidate cells 130 prepared by the CU 110. Among the plurality of prepared candidate cells 130, a respective cell 131 is acted as an assisting cell or a target cell 131 for beam failure recovery. As shown in FIG. 1, the system 100 further comprises a terminal device 140 (also referred to as a UE). As shown in FIG. 1B, the terminal device 140 is moving from a serving cell of source DU 120 to another non-serving cell, and the serving cell change needs to be performed at this time point.

It is to be understood that the particular number of various communication devices, the particular number of various communication links, the particular number of other elements, and the particular shape of the cells as shown in FIG. 1 is for illustration purpose only without suggesting any limitations. The communication system 100 may include any suitable number of communication devices, any suitable number of communication links, and any suitable number of other elements and any suitable shape of the cells adapted for implementing embodiments of the present disclosure. In addition, it should be appreciated that there may be various wireless as well as wireline communications (if needed) among all of the communication devices.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 1002.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
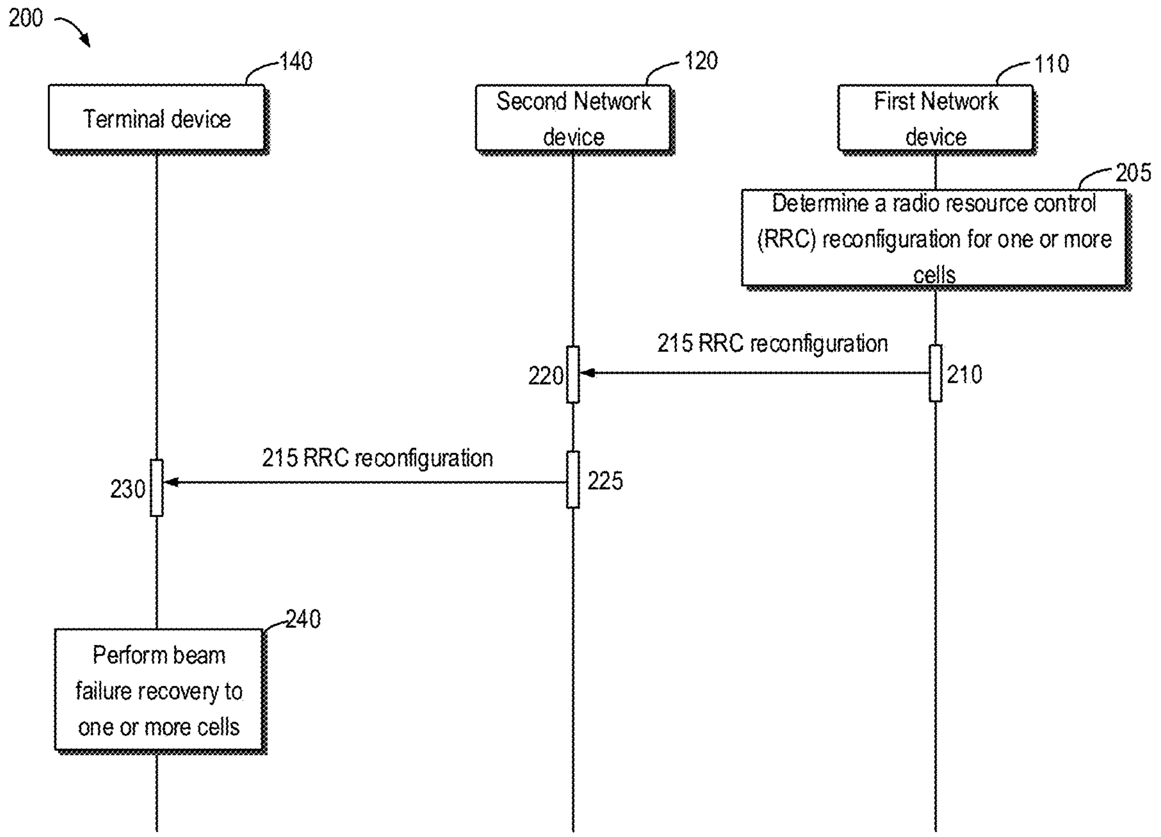
FIG. 2 illustrates a signaling chart illustrating communication process in accordance with some embodiments of the present disclosure.
Figure 3:
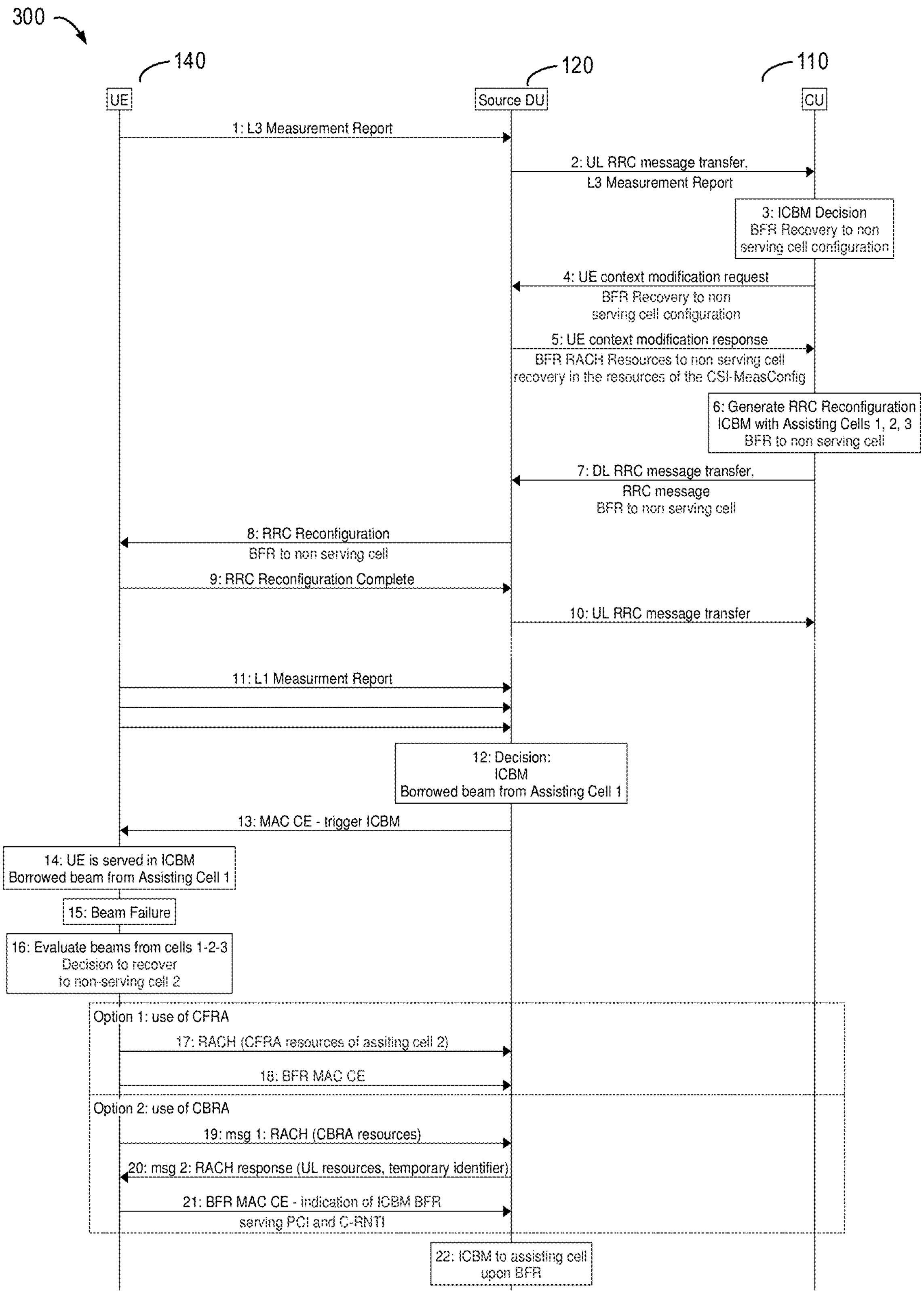
FIG. 3 illustrates an exemplary signaling chart for performing beam failure recovery to a non-serving cell in accordance with some embodiments of the present disclosure.

Hereinafter, the example method for performing beam failure recovery to a non-serving cell will be described with reference to FIG. 2 to FIG. 4. Reference is first made to FIG. 2, which illustrates an exemplary signaling chart illustrating communication process in accordance with some embodiments of the present disclosure.

As shown in FIG. 2, the first network device 110 determines (205) a radio resource control (RRC) reconfiguration 215 for one or more cells prepared by the first network device 110. The RRC reconfiguration 215 includes a beam failure recovery configuration to be used by a terminal device (UE) 140 for performing a beam failure recovery to the one or more cells. The first network device 110 transmits (210) the RRC reconfiguration 215 to a second network device 120. Accordingly, the second network device 120 receives (220), from the first network device 110, the RRC reconfiguration 215.

Upon reception of the RRC reconfiguration 215, the second network device 120 transmits (225) the RRC reconfiguration 215 to the terminal device 140. Accordingly, the terminal device 140 receives (230), from the second network device 120, the RRC reconfiguration. Then in case of detecting a beam failure, the terminal device 140 performs (235) a beam failure recovery to one or more cells based on the RRC reconfiguration.

In some embodiments, the beam failure recovery configuration may indicate the terminal device 140 to initiate a beam failure recovery procedure toward a cell other than a serving cell among the one or more cells in case of detecting a beam failure. For example, the serving cell refers to a cell by which the terminal device 140 is served, and belongs to the second network device (source DU) 120.

In some embodiments, the beam failure recovery configuration may indicate the second network device 120 to perform inter cell beam management (ICBM) through the cell other than the serving cell in case of beam failure recovery. Accordingly, the terminal device 140 is served with ICBM through the cell other than the serving cell. The ICBM enables the terminal device to be served by a beam of the cell other than the serving cell, without changing the serving cell.

In some embodiments, the first network device 110 may determine to set up ICBM and beam failure recovery to the cell other than the serving cell. The first network device 110 may transmit, to the second network device 120, a terminal device context modification request, and accordingly, the second network device 120 may receive the terminal device context modification. Then, the second network device 120 may transmit, to the first network device 110, the terminal device context modification response, and the terminal context modification response may include the beam failure recovery configuration for performing the beam failure recovery to the cell other than the serving cell. Then, the first network device 110 may configure, based on the received terminal device context modification response, the RRC configuration.

In some embodiments, the cell other than the serving cell may also be called as an assisting cell, and the assisting cell and the serving cell may belong to the same network device, for example, the second network device or source DU 120.

In some embodiments, in case of detecting a beam failure, the terminal device 140, based on the beam failure recovery configuration, may initiate a beam failure recovery to the assisting cell. For example, in response to detecting the beam failure, the terminal device 140 may perform beam selection from the prepared one or more cells, identify that the selected beam to be served belongs to the assisting cell, and access to the assisting cell.

In some embodiments, the terminal device 140 may transmit a beam failure recovery media access control (MAC) control element (CE) to the second network device 120. Upon reception of the beam failure recovery MAC CE, the second network device 140 decides that the terminal device 140 is served with the ICBM through the cell other than the serving cell.

In some embodiments, the beam failure recovery configuration may include a contention free random access configuration for the cell other than the serving cell. Based on the contention free random access configuration, the terminal device 140 may access to the cell other than the serving cell.

In some examples, based on the contention free random access configuration, the terminal device 140 may transmit a contention free random access preamble to the second network device 120, and then the terminal device 140 may transmit, to the second network device 120, the beam failure recovery MAC CE.

In some embodiments, the beam failure recovery configuration may include a contention based random access configuration for the cell other than the serving cell. Based on the contention based random access configuration, the terminal device 140 may access to the cell other than the serving cell.

In some examples, based on the contention based random access configuration, the terminal device 140 may transmit a contention based random access preamble to the second network device 120, and then the terminal device 140 may transmit, to the second network device 120, the beam failure recovery MAC CE.

In some embodiments, the beam failure recovery MAC CE may include an indication of the beam failure recovery, an identifier of the terminal device, and an identifier of the serving cell. For example, the identifier of the terminal device may include a Beam Failure Recovery-Cell-Radio-NetworkTemporaryIdentifier (BFR-C-RNTI) allocated specifically for the terminal device, C-RNTI of the terminal device, or other identifier.

In some embodiments, the beam failure recovery configuration may indicate the terminal device to perform the beam failure recovery to the cell other than the serving cell using a layer 1/layer 2 triggered mobility (TM) configuration for the cell other than the serving cell in case of detecting the beam failure. The LTM configuration is determined by the first network device 110. The LTM enables the terminal device to switch to the cell other than the serving cell.

In some embodiments, the cell other than the serving cell may also be called as a target cell, and the target cell and the serving cell may belong to the same nodes, for example, the second network device or source DU 120; or the target cell and the serving cell may belong to different nodes, for example, the target cell may belong to the target DU, and the serving cell may belong to the source DU 131.

In some embodiments, in case of detecting a beam failure, the terminal device 140, based on the beam failure recovery configuration, may initiate a beam failure recovery to the target cell. For example, in response to detecting the beam failure, the terminal device 140 may perform beam selection from the prepared one or more cells, identify that the selected beam to be served belongs to the target cell, and access to the target cell.

In some embodiments, the terminal device 140 may transmit a RRC reconfiguration complete message including an indication of the beam failure recovery to a node 131 providing the cell other than the serving cell. Then, the node 131 providing the cell than the serving cell may transmit the RRC reconfiguration complete message to the first terminal device. Upon reception of the RRC reconfiguration complete message, the first terminal device 110 may perform a cell switch, so that the terminal device 140 may switch to the cell other than the serving cell.

In some embodiments, the LTM configuration for the cell other than the serving cell may a contention free random access configuration for the cell other than the serving cell.

Based on the contention free random access configuration, the terminal device 140 may access to the cell other than the serving cell.

In some examples, based on the contention free random access configuration, the terminal device 140 may transmit, to the node 131 providing the cell other than the serving cell, a contention free random access preamble using the LTM configuration for the cell other than the serving cell, and then the terminal device 140 may transmit, to the node 131 providing the cell other than the serving cell, the RRC reconfiguration complete message.

In some embodiments, the LTM configuration for the cell other than the serving cell may include a contention based random access configuration for the cell other than the serving cell. Based on the contention based random access configuration, the terminal device 140 may access to the cell other than the serving cell.

In some examples, based on the contention based random access configuration, the terminal device 140 may transmit, to the node 131 providing the cell other than the serving cell, a contention based random access preamble using the LTM configuration for the cell other than the serving cell, and then the terminal device 140 may transmit, to the node 131 providing the cell other than the serving cell, the RRC reconfiguration complete message.

In some embodiments, the RRC reconfiguration complete message may include an indication of the beam failure recovery and an identifier of the terminal device, and may also include an identifier of the serving cell. For example, the identifier of the terminal device may include a Beam Failure Recovery-Cell-RadioNetworkTemporaryIdentifier (BFR-C-RNTI) allocated specifically for the terminal device, C-RNTI of the terminal device, or other identifier.

In some embodiments, in case of obtaining the timing advance of the terminal device, the terminal device 140 may transmit, to the node 131 providing the cell other than the serving cell, the RRC reconfiguration complete message. For example, the timing advance of the terminal device may be obtained via an early timing advance acquisition procedure or a UE-based timing advance measurement.

Hereinafter, the exemplary signaling chart 300 for performing beam failure recovery to a non-serving cell in accordance with some embodiments of the present disclosure will be described with reference to FIG. 3. In this example solution, it is proposed that the serving cell and assisting cells belong to the same DU, the UE 140 is configured with BFR resources of assisting cell and the BRF resources are configured as a set of CSI-RS resources of the assisting cell. In case of detecting a beam failure in the serving cell, the UE 140 transmits an indication about the BFR to the assisting cell, and the UE 140 identifies its arrival to the assisting cell to enable the UE 140 to access there. Then the UE 140 ends up in ICBM with the assisting cell. The steps of the BFR to non-serving cell and ICBM operation are shown in FIG. 3 and the steps are described as follows.

At steps 1 to 2, the UE 140 provides measurement reports to the CU 110, for example, a L3 measurement report. At steps 3, the CU 110 decides to set up ICBM and BFR with resources from the assisting cells (for example, the assisting cell 1, the assisting cell 2, the assisting cell 3).

At steps 4 to 5, the CU 110 with a UE context modification request asks from the DU 120 to set up ICBM and BFR with resources from the assisting cells 1, 2, 3; the DU 120 responds with a UE context modification response containing BFR configuration for the assisting cells 1, 2, 3 (e.g., SSBs/CSI-RSs, preambles, etc.). It should be noted that with ICBM configuration of cell 1, 2, 3, the UE 140 is configured to measure and/or report beams from these cells.

At steps 6 to 8, the CU 110 prepares the RRC reconfiguration with the BFR resources from the assisting cells and provides the RRC reconfiguration to the UE 140. At steps 11-14, the UE 140 acknowledges the proper reception of the RRC reconfiguration.

At steps 11-14, the UE 140 provides L1 measurement reports to the serving DU 120 and the serving DU 120 at some point of time decides to start ICBM operation with a borrowed beam from a non-serving cell (for example, cell 1). The UE 140 starts being served by a neighboring cell (for example, cell 1), through ICBM (using a borrowed beam from a non-serving cell). The skilled in the art can understand that steps 11-14 are not mandatory.

At step 15, at some point of time, the UE 140 experiences a beam failure. At step 16, upon detecting the beam failure, the UE 140 performs a beam selection and identifies that the best beam to be served belongs to the assisting cell (for example, the assisting cell 2).

In option 1 which may be applied in cased of CFRA, at step 17, the UE 140 sends a CFRA preamble to the assisting cell 2. The assisting cell 2, considering the CFRA preamble, understands that the UE who accesses the assisting cell performs BFR to the assisting cell 2. At step 18, the UE 140 sends a BFR MAC CE to the assisting cell 2.

In option 2 which may be applied in case of CBRA (for example, when the same BFR RACH resources are allocated for multiple different cells or/and multiple UEs of the same cell), at step 19, the UE 140 sends a CBRA preamble to the assisting cell. At step 20, the UE 140 sends a BFR MAC CE to the assisting cell 2. In order to be identified by the assisting cell 2, the UE 140 includes in the MAC CE an indication that this is BFR to assisting cell and also the UE's unique identifier (e.g., a BFR-C-RNTI allocated specifically for this, its C-RNTI, or another identifier) and the identifier of the serving cell. Using these identifiers, the DU 120 can associate the UE context with the source cell.

At step 21, the UE 140 is being served with ICBM, through the assisting cell. In such case, the original serving cell does not change, which shows no mobility.

Figure 4:
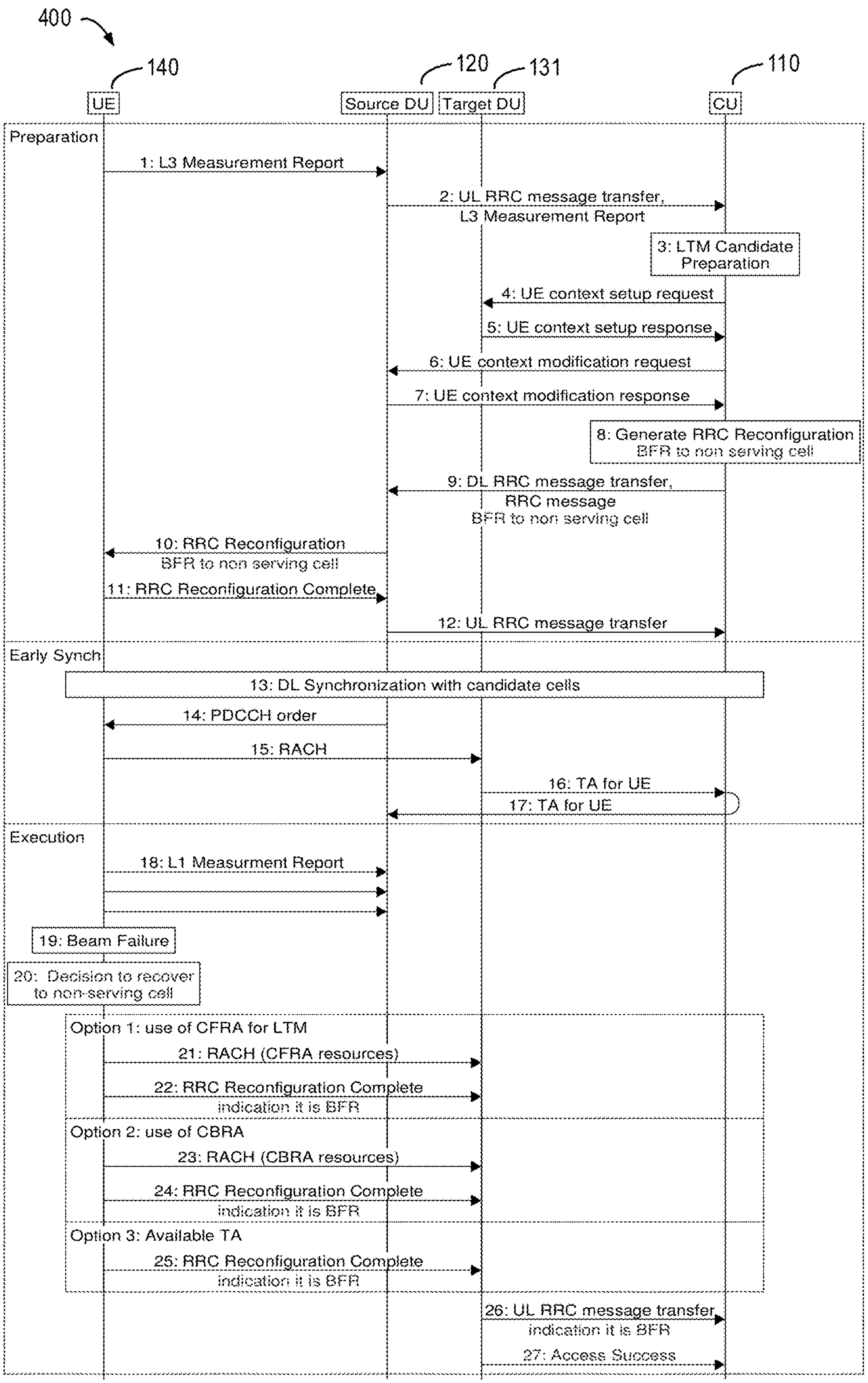
FIG. 4 illustrates an exemplary signaling chart for performing beam failure recovery to a non-serving cell in accordance with some embodiments of the present disclosure.

Hereinafter, FIG. 4 illustrates an exemplary signaling chart for performing beam failure recovery to a non-serving cell in accordance with some embodiments of the present disclosure. In this solution, it is proposed that on beam-failure detection in serving cell, after identifying the beam for recovery in Target-cell, UE applies a new configuration, specifically, the UE performs an autonomous LTM switch for BFR. In case of CFRA, UE uses RACH resources for LTM. This gives implicit indication to Target node that it is LTM switch for beam-failure recovery along with beam-specific-recovery. In case of CBRA, UE uses CBRA resources but indicates to the target cell (either in the RRC Reconfiguration Complete or in the MAC CE) that this is a BFR to non-serving cell. If TA has already been acquired for the target cell, the UE will indicate in the RRC Reconfiguration Complete that it is BFR. The steps of the BFR to non-serving cell and LTM operation are shown in FIG. 4 and the steps of FIG. 4 are described as follows.

At steps 1-2, the UE 140 provides measurement reports to the CU 110. At step 3, the CU 110 decides to set up LTM with BFR from the target cells. At steps 4-5, the CU 110 with a UE set up configures BFR to non-serving cell for LTM. At steps 6-7, the CU 110 provides the target cell configurations to the serving DU 120.

At steps 8-10, the CU 110 prepares the RRC configuration with the BFR to non-serving cell configuration and provides it to the UE 140. At steps 11-12, the UE 140 acknowledges the proper reception of the RRC reconfiguration. At step 13-17, the UE 140 performs early DL/UL synchronization. UL synchronization may be triggered by the network using a PDCCH order, triggering the UE 140 to send a RACH to the target cell 131. The target cell 131 obtains the Timing Advance for the UE and sends it to the source DU 120. At step 18, UE 140 provides L1 measurements to the DU 120 for beam management and mobility.

At step 19, at some point of time, the UE 140 experiences a Beam Failure. At step 20, upon beam failure detection, the UE 140 performs beam selection and identifies that the best beam to be served belongs to a prepared LTM candidate target cell.

In option 1 which may be applied in cased of CFRA, at step 21, the UE 140 sends a CFRA preamble to the target cell 131. The target cell 131, considering the CFRA preamble understands that the UE 140 who accesses it performs mobility and it provides to the UE the Timing Advance in the Random Access Response. At step 22, the UE 140 sends an RRC Reconfiguration containing an indication it is BFR.

In option 2 which may be applied in cased of CBRA, at step 23, the UE 140 sends a CBRA preamble to the target cell 131. The target cell 131, considers this is a regular cell access to the target cell, which is relevant to mobility. Then it provides to the UE 140 the Timing Advance in the Random Access Response. At step 24, the UE 140 sends an RRC Reconfiguration containing an indication it is BFR. The UE 140 may also include its unique identifier (e.g., a BFR-C-RNTI allocated specifically for this, its C-RNTI, or another identifier) and the identifier of the serving cell. Using these identifiers, the DU can associate the UE context with the source cell.

In option 3 which may be applied in cased the UE knows the Timing Advance (e.g., via early TA acquisition procedure or UE-based TA measurement), at step 25, the UE 140 sends an RRC Reconfiguration Complete containing an indication it is BFR.

At step 26, the Target DU 131 sends to the CU 110 the RRC Reconfiguration containing an indication it is BFR using UL RRC message transfer; CU 110 performs Cell change. At step 27, the DU 131 sends an Access Success message since it interprets the access to the target as a mobility process.

In such case, if each serving cell is already configured with BFR RACH resources for recovery, the UE will decide to trigger LTM recovery instead of CFRA if the LTM target beams are better than BFR SSB of the source cell. DU can configure the radio-condition difference to prioritize LTM recovery over BFR via serving cell beams.

Figure 5:
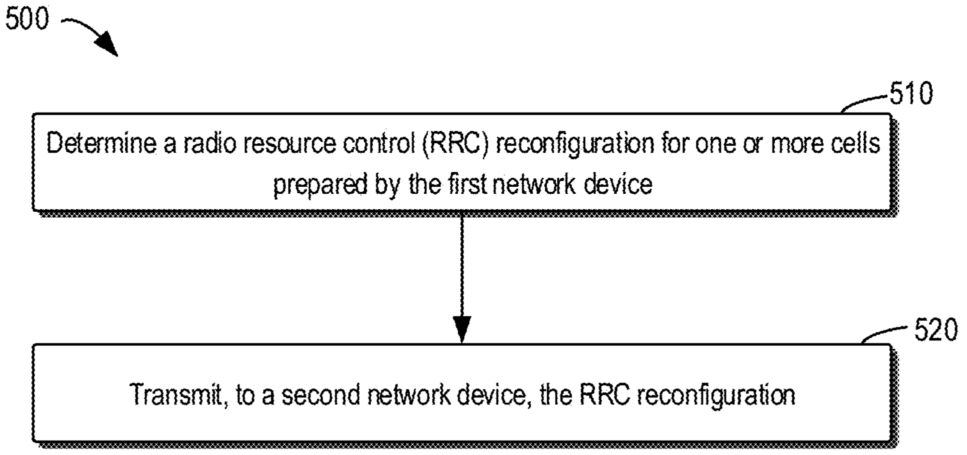
FIG. 5 illustrates a flowchart of a method implemented at a first network device in accordance with some embodiments of the present disclosure.

FIG. 5 illustrates a flowchart of a method 500 implemented at a first network device (e.g. the CU 110) in accordance with some embodiments of the present disclosure. For the purpose of discussion, the method 500 will be described from the perspective of the CU 110 with reference to FIG. 1.

At block 510, the first network device 110 determine a radio resource control (RRC) reconfiguration for one or more cells prepared by the first network device, wherein the RRC reconfiguration comprises a beam failure recovery configuration to be used by a terminal device for performing a beam failure recovery to the one or more cells. At block 520, the first network device 110 transmits, to a second network device 120, the RRC reconfiguration.

In some embodiments, the beam failure recovery configuration indicates the terminal device to initiate a beam failure recovery procedure towards a cell other than a serving cell among the one or more cells in case of detecting a beam failure.

In some embodiments, the beam failure recovery configuration indicates the second network device to perform, based on reception of a beam failure recovery media access control (MAC) control element (CE), an inter cell beam management through the cell other than the serving cell in case of beam failure recovery.

In some embodiments, the beam failure recovery configuration comprises a contention free random access configuration for the cell other than the serving cell; and the beam failure recovery configuration indicates the terminal device to access the cell other than the serving cell based on the contention free random access configuration. In some embodiments, the beam failure recovery configuration indicates the terminal device to: transmit, to the second network device, a contention free random access preamble; and transmit, to the second network device, the beam failure recovery MAC CE.

In some embodiments, the beam failure recovery configuration comprises a contention based random access configuration for the cell other than the serving cell; and the beam failure recovery configuration indicates the terminal device to access the cell other than the serving cell based on the contention based random access configuration.

In some embodiments, the beam failure recovery configuration indicates the terminal device to: transmit, to the second network device, a contention based random access preamble; and transmit, to the second network device, the beam failure recovery MAC CE. In some embodiments, wherein the beam failure recovery MAC CE comprises an indication of the beam failure recovery, an identifier of the terminal device, and an identifier of the serving cell.

In some embodiments, the first network device 110 transmits, to the second network device 120, a terminal device context modification request; receives, from the second network device 120, a terminal device context modification response comprising the beam failure recovery configuration for performing the beam failure recovery to the cell other than the serving cell; and configures, based on the received terminal device context modification response, the RRC reconfiguration.

In some embodiments, the first network device 110 receives, from a node 131 providing the cell other than the serving cell, a RRC reconfiguration complete message comprising an indication of the beam failure recovery; and performs, based on reception of the indication of the beam failure recovery, a cell switch.

In some embodiments, the first network device 110 determines a layer 1/layer 2 triggered mobility (LTM) configuration for the one or more cells; and the beam recovery configuration indicates the terminal device to perform the beam failure recovery to the cell other than the serving cell using a LTM configuration for the cell other than the serving cell in case of detecting the beam failure.

In some embodiments, the LTM configuration for the cell other than the serving cell comprises a contention free random access configuration for the cell other than the serving cell; and the beam failure recovery configuration indicates the terminal device to access the cell other than the serving cell based on the contention free random access configuration in a case of detecting the beam failure.

In some embodiments, the beam failure recovery configuration indicates the terminal device to: transmit, to a node providing the cell other than the serving cell, a contention free random access preamble using the LTM configuration for the cell other than the serving cell; and transmit, to the node providing the cell other than the serving cell, the RRC reconfiguration complete message comprising the indication of the beam failure recovery.

In some embodiments, the LTM configuration for the cell other than the serving cell comprises a contention based random access configuration for the cell other than the serving cell; and the beam failure recovery configuration indicates the terminal device to access the cell other than the serving cell based on the contention based random access configuration in case of detecting the beam failure.

In some embodiments, the beam failure recovery configuration indicates the terminal device to: transmit, to the node providing the cell other than the serving cell, a contention based random access preamble using the LTM configuration for the cell other than the serving cell; and transmit, to the node providing the cell other than the serving cell, the RRC reconfiguration complete message comprising the indication of the beam failure recovery. In some embodiments, the RRC reconfiguration complete message further comprises an identifier of the terminal device.

In some embodiments, the beam failure recovery configuration indicates the terminal device to transmit, to the node providing the cell other than the serving cell, the RRC reconfiguration complete message comprising the indication of the beam failure recovery based on obtaining of a timing advance of the terminal device.

In some embodiments, the first network device 110 comprises a central unit of a base station; and the second network device 120 comprises a distributed unit of the base station.

Figure 6:
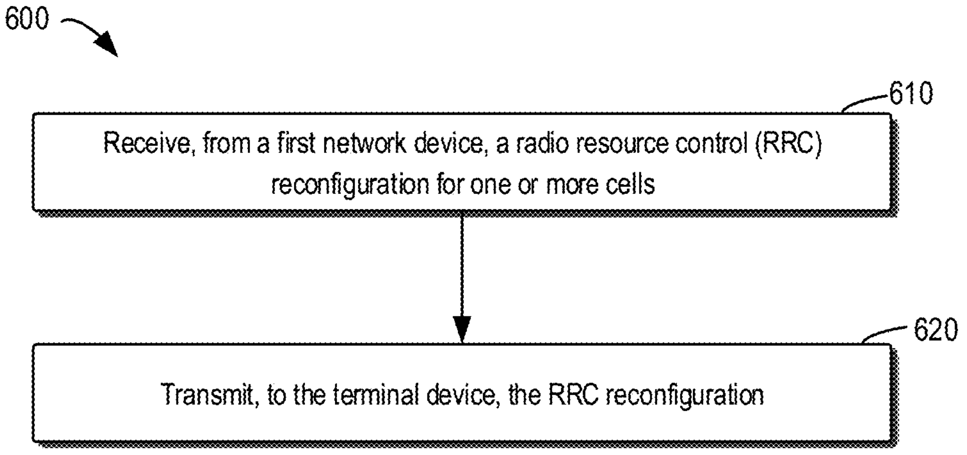
FIG. 6 illustrates a flowchart of a method implemented at a second network device in accordance with some embodiments of the present disclosure.

FIG. 6 illustrates a flowchart of a method 600 implemented at a second network device in accordance with some embodiments of the present disclosure. For the purpose of discussion, the method 600 will be described from the perspective of the source DU 120 with reference to FIG. 1.

At block 610, the second network device 120 receives, from a first network device 110, a radio resource control (RRC) reconfiguration for one or more cells prepared by the first network device, wherein the RRC reconfiguration comprises a beam failure recovery configuration to be used by a terminal device for performing a beam failure recovery to the one or more cells. At block 620, the second network device 120 transmits, to the terminal device 140, the RRC reconfiguration.

In some embodiments, the beam failure recovery configuration indicates the terminal device to initiate a beam failure recovery procedure towards a cell other than the serving cell among the one or more cells in case of detecting a beam failure.

In some embodiments, the second network device 120 further performs, based on reception of a beam failure recovery media access control (MAC) control element (CE), an inter cell beam management through the cell other than the serving cell in case of beam failure recovery In some embodiments, the beam failure recovery configuration comprises a contention free random access configuration for the cell other than the serving cell, and the beam failure recovery configuration indicates the terminal device to access the cell other than the serving cell based on the contention free random access configuration.

In some embodiments, the second network device 120 receives, from the terminal device 140, a contention free random access preamble, and receives, from the terminal device 140, the beam failure recovery MAC CE.

In some embodiments, the beam failure recovery configuration comprises a contention based random access configuration for the cell other than the serving cell, and the beam failure recovery configuration indicates the terminal to access the cell other than the serving cell based on the contention based random access configuration.

In some embodiments, the second network device 120 receives, from the terminal device, a contention based random access preamble; and receive, from the terminal device, the beam failure recovery MAC CE.

In some embodiments, the beam failure recovery MAC CE comprises an indication of the beam failure recovery, an identifier of the terminal device and an identifier of the serving cell.

In some embodiments, the second network device 120 receives, from the first network device, a terminal device context modification request; and transmits, to the first network device, a terminal device context modification response comprising the beam failure recovery configuration for performing the beam failure recovery to the cell other than the serving cell.

In some embodiments, the first network device 110 comprises a central unit of a base station; and the second network device 120 comprises a distributed unit of the base station.

Figure 7:
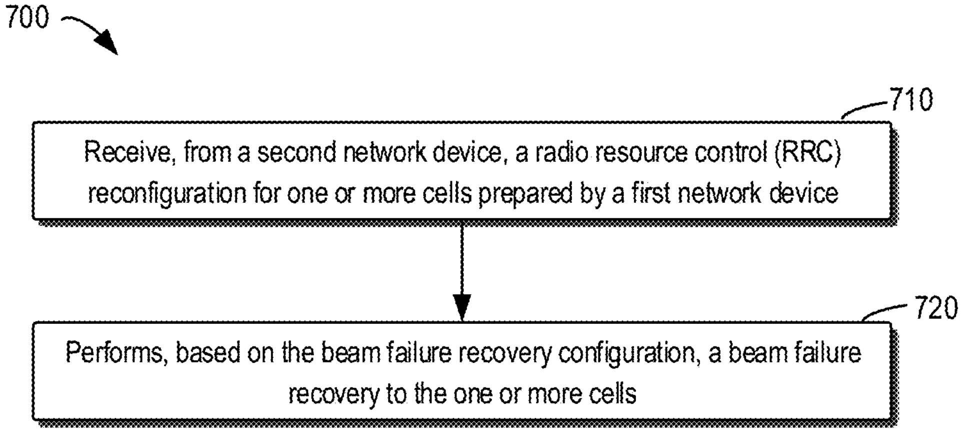
FIG. 7 illustrates a flowchart of a method implemented at a terminal device in accordance with some embodiments of the present disclosure.

FIG. 7 illustrates a flowchart of a method implemented at a terminal device according to some other embodiments of the present disclosure. For the purpose of discussion, the method 700 will be described from the perspective of the terminal device 140 with reference to FIG. 1.

At block 710, the terminal device 140 receive, from a second network device 120, a radio resource control (RRC) reconfiguration for one or more cells prepared by a first network device, wherein the RRC reconfiguration comprises a beam failure recovery configuration. At block 720, the terminal device 140 performs, based on the beam failure recovery configuration, a beam failure recovery to the one or more cells.

In some embodiments, the terminal device 140 detects a beam failure; and based on the beam failure recovery configuration, initiates a beam failure recovery procedure towards a cell other than the serving cell among the one or more cells.

In some embodiments, the terminal device 140 transmits, to the second network device, a beam failure recovery media access control (MAC) control element (CE). The beam failure recovery configuration indicates the second network device to perform, based on reception of the beam failure recovery MAC CE by the second network device, an inter cell beam management through the cell other than the serving cell in case of beam failure recovery.

In some embodiments, the beam failure recovery configuration comprises a contention free random access configuration for the cell other than the serving cell, and the terminal device is further caused to access the cell other than the serving cell based on the contention free random access configuration.

In some embodiments, based on the beam failure recovery configuration, the terminal device 140 transmits, to the second network device, a contention free random access preamble; and transmit, to the second network device, the beam failure recovery MAC CE.

In some embodiments, the beam failure recovery configuration comprises a contention based random access configuration for the cell other than the serving cell, and the terminal device is further caused to access the cell other than the serving cell based on the contention based random access configuration.

In some embodiments, based on the beam failure recovery configuration, the terminal device 140 transmits, to the second network device, a contention based random access preamble; and transmits, to the second network device, the beam failure recovery MAC CE.

In some embodiments, the beam failure recovery MAC CE comprises an indication of the beam failure recovery, an identifier of the terminal device and an identifier of the serving cell.

In some embodiments, the terminal device 140 transmits, to the cell other than the serving cell, a RRC reconfiguration complete message comprising an indication of the beam failure recovery.

In some embodiments, based on the beam failure recovery configuration, the terminal device 140 performs the beam failure recovery to the cell other than the serving cell using a LTM configuration for the cell other than the serving cell in case of detecting the beam failure.

In some embodiments, the LTM configuration for the cell other than the serving cell comprises a contention free random access configuration for the cell other than the serving cell, and the terminal device is further caused to access the cell other than the serving cell based on the contention free random access configuration in a case of detecting the beam failure.

In some embodiments, based on the beam failure recovery configuration, the terminal device 140 transmits, to a node providing the cell other than the serving cell, a contention free random access preamble using the LTM configuration for the cell other than the serving cell; and transmit, to the node providing the cell other than the serving cell, the RRC reconfiguration complete message comprising the indication of the beam failure recovery.

In some embodiments, the LTM configuration for the cell other than the serving cell comprises a contention based random access configuration for the cell other than the serving cell, and the terminal device is further caused to access the cell other than the serving cell based on the contention based random access configuration in case of detecting the beam failure.

In some embodiments, based on the beam failure recovery configuration, the terminal device 140 transmits, to the node providing the cell other than the serving cell, a contention based random access preamble using the LTM configuration for the cell other than the serving cell; and transmits, to the node providing the cell other than the serving cell, the RRC reconfiguration complete message comprising the indication of the beam failure recovery.

In some embodiments, the RRC reconfiguration complete message further comprises an identifier of the terminal device.

In some embodiments, based on the beam failure recovery configuration, the terminal device 140 obtains a timing advance of the terminal device; and transmits, to the network device providing the cell other than the serving cell, the RRC reconfiguration complete message comprising the indication of the beam failure recovery.

In some embodiments, the first network device 110 comprises a central unit of a base station; and the second network device 120 comprises a distributed unit of the base station.

In some embodiments, an apparatus (for example, the CU 110) capable of performing the method 500 may comprise means for performing the respective steps of the method 500. The means may be implemented in any suitable form. For example, the means may be implemented in a circuitry or software module.

In some embodiments, the apparatus comprises means for determining a radio resource control (RRC) reconfiguration for one or more cells prepared by the first network device, wherein the RRC reconfiguration comprises a beam failure recovery configuration to be used by a terminal device for performing a beam failure recovery to the one or more cells. The apparatus comprises means for transmitting, to a second network device 120, the RRC reconfiguration.

In some embodiments, the beam failure recovery configuration indicates the terminal device to initiate a beam failure recovery procedure towards a cell other than a serving cell among the one or more cells in case of detecting a beam failure.

In some embodiments, the beam failure recovery configuration indicates the second network device to perform, based on reception of a beam failure recovery media access control (MAC) control element (CE), an inter cell beam management through the cell other than the serving cell in case of beam failure recovery.

In some embodiments, the beam failure recovery configuration comprises a contention free random access configuration for the cell other than the serving cell; and the beam failure recovery configuration indicates the terminal device to access the cell other than the serving cell based on the contention free random access configuration. In some embodiments, the beam failure recovery configuration indicates the terminal device to: transmit, to the second network device, a contention free random access preamble; and transmit, to the second network device, the beam failure recovery MAC CE.

In some embodiments, the beam failure recovery configuration comprises a contention based random access configuration for the cell other than the serving cell; and the beam failure recovery configuration indicates the terminal device to access the cell other than the serving cell based on the contention based random access configuration.

In some embodiments, the beam failure recovery configuration indicates the terminal device to: transmit, to the second network device, a contention based random access preamble; and transmit, to the second network device, the beam failure recovery MAC CE. In some embodiments, wherein the beam failure recovery MAC CE comprises an indication of the beam failure recovery, an identifier of the terminal device, and an identifier of the serving cell.

In some embodiments, the apparatus further comprises means for transmitting, to the second network device 120, a terminal device context modification request; means for receiving, from the second network device 120, a terminal device context modification response comprising the beam failure recovery configuration for performing the beam failure recovery to the cell other than the serving cell; and means for configuring, based on the received terminal device context modification response, the RRC reconfiguration.

In some embodiments, the apparatus further comprises means for receiving, from a node 131 providing the cell other than the serving cell, a RRC reconfiguration complete message comprising an indication of the beam failure recovery; and means for performing, based on reception of the indication of the beam failure recovery, a cell switch.

In some embodiments, the apparatus further comprises means for determining a layer 1/layer 2 triggered mobility (LTM) configuration for the one or more cells; and the beam recovery configuration indicates the terminal device to perform the beam failure recovery to the cell other than the serving cell using a LTM configuration for the cell other than the serving cell in case of detecting the beam failure.

In some embodiments, the LTM configuration for the cell other than the serving cell comprises a contention free random access configuration for the cell other than the serving cell; and the beam failure recovery configuration indicates the terminal device to access the cell other than the serving cell based on the contention free random access configuration in a case of detecting the beam failure.

In some embodiments, the beam failure recovery configuration indicates the terminal device to: transmit, to a node providing the cell other than the serving cell, a contention free random access preamble using the LTM configuration for the cell other than the serving cell; and transmit, to the node providing the cell other than the serving cell, the RRC reconfiguration complete message comprising the indication of the beam failure recovery.

In some embodiments, the LTM configuration for the cell other than the serving cell comprises a contention based random access configuration for the cell other than the serving cell; and the beam failure recovery configuration indicates the terminal device to access the cell other than the serving cell based on the contention based random access configuration in case of detecting the beam failure.

In some embodiments, the beam failure recovery configuration indicates the terminal device to: transmit, to the node providing the cell other than the serving cell, a contention based random access preamble using the LTM configuration for the cell other than the serving cell; and transmit, to the node providing the cell other than the serving cell, the RRC reconfiguration complete message comprising the indication of the beam failure recovery. In some embodiments, the RRC reconfiguration complete message further comprises an identifier of the terminal device.

In some embodiments, the beam failure recovery configuration indicates the terminal device to transmit, to the node providing the cell other than the serving cell, the RRC reconfiguration complete message comprising the indication of the beam failure recovery based on obtaining of a timing advance of the terminal device.

In some embodiments, the first network device 110 comprises a central unit of a base station; and the second network device 120 comprises a distributed unit of the base station.

In some embodiments, the apparatus further comprises means for performing other steps in some embodiments of the method 500. In some embodiments, the means comprises at least one processor and at least one memory including computer program code, the at least one memory and computer program code configured to, with the at least one processor, cause the performance of the apparatus.

In some embodiments, an apparatus (for example, the source DU 120) capable of performing the method 600 may comprise means for performing the respective steps of the method 600. The means may be implemented in any suitable form. For example, the means may be implemented in a circuitry or software module.

In some embodiments, the apparatus comprises means for receiving, from a first network device 110, a radio resource control (RRC) reconfiguration for one or more cells prepared by the first network device, wherein the RRC reconfiguration comprises a beam failure recovery configuration to be used by a terminal device for performing a beam failure recovery to the one or more cells, the apparatus further comprises means for transmitting, to the terminal device 140, the RRC reconfiguration.

In some embodiments, the beam failure recovery configuration indicates the terminal device to initiate a beam failure recovery procedure towards a cell other than the serving cell among the one or more cells in case of detecting a beam failure.

In some embodiments, the apparatus further comprises means for performing, based on reception of a beam failure recovery media access control (MAC) control element (CE), an inter cell beam management through the cell other than the serving cell in case of beam failure recovery In some embodiments, the beam failure recovery configuration comprises a contention free random access configuration for the cell other than the serving cell, and the beam failure recovery configuration indicates the terminal device to access the cell other than the serving cell based on the contention free random access configuration.

In some embodiments, the apparatus further comprises means for receiving, from the terminal device 140, a contention free random access preamble; and means for receiving, from the terminal device 140, the beam failure recovery MAC CE.

In some embodiments, the beam failure recovery configuration comprises a contention based random access configuration for the cell other than the serving cell, and the beam failure recovery configuration indicates the terminal to access the cell other than the serving cell based on the contention based random access configuration.

In some embodiments, the apparatus further comprises means for receiving, from the terminal device, a contention based random access preamble; and means for receiving, from the terminal device, the beam failure recovery MAC CE.

In some embodiments, the beam failure recovery MAC CE comprises an indication of the beam failure recovery, an identifier of the terminal device and an identifier of the serving cell.

In some embodiments, the apparatus further comprises means for receiving, from the first network device, a terminal device context modification request; and means for transmitting, to the first network device, a terminal device context modification response comprising the beam failure recovery configuration for performing the beam failure recovery to the cell other than the serving cell.

In some embodiments, the first network device 110 comprises a central unit of a base station; and the second network device 120 comprises a distributed unit of the base station.

In some embodiments, the apparatus further comprises means for performing other steps in some embodiments of the method 600. In some embodiments, the means comprises at least one processor and at least one memory including computer program code, the at least one memory and computer program code configured to, with the at least one processor, cause the performance of the apparatus.

In some embodiments, an apparatus (for example, a terminal device 140) capable of performing the method 700 may comprise means for performing the respective steps of the method 700. The means may be implemented in any suitable form. For example, the means may be implemented in a circuitry or software module.

In some embodiments, the apparatus further comprises means for receiving, from a second network device 120, a radio resource control (RRC) reconfiguration for one or more cells prepared by a first network device, wherein the RRC reconfiguration comprises a beam failure recovery configuration. The apparatus further comprises means for performing, based on the beam failure recovery configuration, a beam failure recovery to the one or more cells.

In some embodiments, the apparatus further comprises means for detecting a beam failure; and means for, based on the beam failure recovery configuration, initiating a beam failure recovery procedure towards a cell other than the serving cell among the one or more cells.

In some embodiments, the apparatus further comprises means for transmitting, to the second network device, a beam failure recovery media access control (MAC) control element (CE). The beam failure recovery configuration indicates the second network device to perform, based on reception of the beam failure recovery MAC CE by the second network device, an inter cell beam management through the cell other than the serving cell in case of beam failure recovery.

In some embodiments, the beam failure recovery configuration comprises a contention free random access configuration for the cell other than the serving cell, and the apparatus further comprises means for accessing the cell other than the serving cell based on the contention free random access configuration.

In some embodiments, the apparatus further comprises means for, based on the transmitting, to the second network device, a contention free random access preamble; and means for transmitting, to the second network device, the beam failure recovery MAC CE.

In some embodiments, the beam failure recovery configuration comprises a contention based random access configuration for the cell other than the serving cell, and the apparatus further comprises means for accessing the cell other than the serving cell based on the contention based random access configuration.

In some embodiments, the apparatus further comprises means for, based on the beam failure recovery configuration, transmitting, to the second network device, a contention based random access preamble; and means for transmitting, to the second network device, the beam failure recovery MAC CE.

In some embodiments, the beam failure recovery MAC CE comprises an indication of the beam failure recovery, an identifier of the terminal device and an identifier of the serving cell.

In some embodiments, the apparatus further comprises means for transmitting, to the cell other than the serving cell, a RRC reconfiguration complete message comprising an indication of the beam failure recovery.

In some embodiments, the apparatus further comprises means for, based on the beam failure recovery configuration, means for performing the beam failure recovery to the cell other than the serving cell using a LTM configuration for the cell other than the serving cell in case of detecting the beam failure.

In some embodiments, the LTM configuration for the cell other than the serving cell comprises a contention free random access configuration for the cell other than the serving cell, and the apparatus further comprises means for accessing the cell other than the serving cell based on the contention free random access configuration in a case of detecting the beam failure.

In some embodiments, the apparatus further comprises means for, based on the beam failure recovery configuration, transmitting, to a node providing the cell other than the serving cell, a contention free random access preamble using the LTM configuration for the cell other than the serving cell; and means for transmitting, to the node providing the cell other than the serving cell, the RRC reconfiguration complete message comprising the indication of the beam failure recovery.

In some embodiments, the LTM configuration for the cell other than the serving cell comprises a contention based random access configuration for the cell other than the serving cell, and the apparatus further comprises means for accessing the cell other than the serving cell based on the contention based random access configuration in case of detecting the beam failure.

In some embodiments, the apparatus further comprises means for, based on the beam failure recovery configuration, transmitting, to the node providing the cell other than the serving cell, a contention based random access preamble using the LTM configuration for the cell other than the serving cell; and means for transmitting, to the node providing the cell other than the serving cell, the RRC reconfiguration complete message comprising the indication of the beam failure recovery.

In some embodiments, the RRC reconfiguration complete message further comprises an identifier of the terminal device.

In some embodiments, the apparatus further comprises means for, based on the beam failure recovery configuration, obtaining a timing advance of the terminal device; and transmits, to the network device providing the cell other than the serving cell, the RRC reconfiguration complete message comprising the indication of the beam failure recovery.

In some embodiments, the first network device 110 comprises a central unit of a base station; and the second network device 120 comprises a distributed unit of the base station.

In some embodiments, the apparatus further comprises means for performing other steps in some embodiments of the method 700. In some embodiments, the means comprises at least one processor and at least one memory including computer program code, the at least one memory and computer program code configured to, with the at least one processor, cause the performance of the apparatus.

Figure 8:
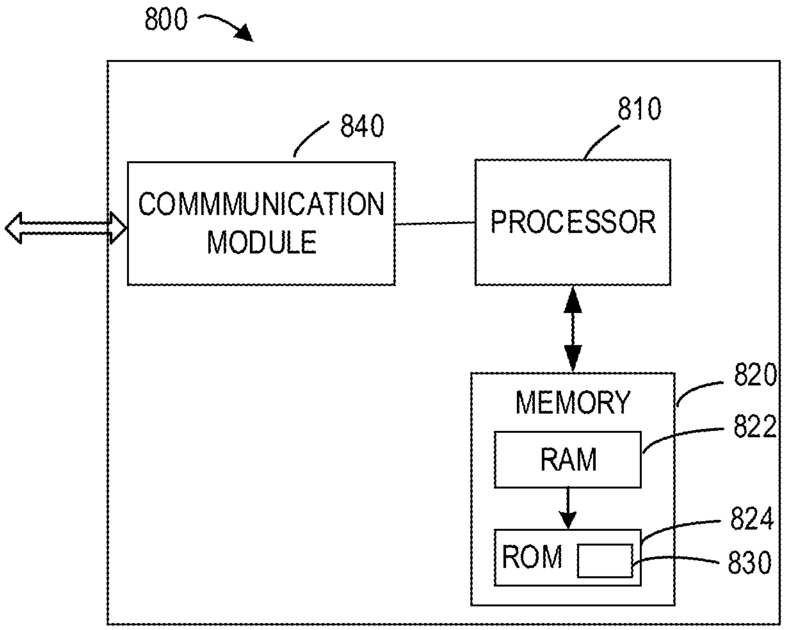
FIG. 8 illustrates a simplified block diagram of an apparatus that is suitable for implementing embodiments of the present disclosure.

FIG. 8 is a simplified block diagram of a device 800 that is suitable for implementing embodiments of the present disclosure. The device 800 may be provided to implement the communication device, for example the terminal device 140, and the network devices 110, 120, and 130 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network devices.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a read only memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that may not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program so that the device 800 may perform any process of the disclosure as discussed with reference to FIGS. 2 to 7. The embodiments of the present disclosure may also be implemented by hardware or by a combination of software and hardware.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like.

Figure 9:
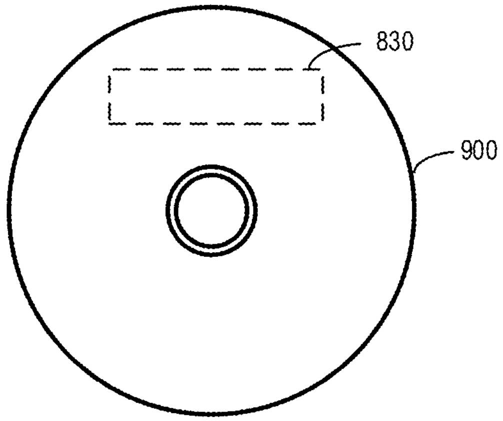
FIG. 9 illustrates a block diagram of an example computer readable medium in accordance with some embodiments of the present disclosure.

FIG. 9 illustrates an example of the computer readable medium 900 in form of CD or DVD in accordance with some embodiments of the present disclosure. The computer readable medium has the program 830 stored thereon. It is noted that although the computer-readable medium 900 is depicted in form of CD or DVD, the computer-readable medium 900 may be in any other form suitable for carry or hold the program 830.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500, 600, or 700 as described above with reference to FIG. 5 to FIG. 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that may be described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above may be disclosed as example forms of implementing the claims.

We claim:

1. A system comprising:
a terminal device;
first network device; and
a second network device;
the first network device comprising:
  a first processor;
  a first memory storing first instructions that, when executed by the first processor, cause the first network device at least to:
    transmit, to the second network device, a terminal device context modification request;
    receive, from the second network device, a terminal device context modification response comprising a beam failure recovery configuration for performing a beam failure recovery to one or more cells other than a serving cell; and based on the received terminal device context modification response, determine a radio resource control (RRC) reconfiguration for the one or more cells prepared by the first network device, wherein the RRC reconfiguration comprises a beam failure recovery configuration to be used by the terminal device for performing a beam failure recovery to the one or more cells, the beam failure recovery configuration indicates the terminal device to initiate a beam failure recovery procedure towards a cell other than a serving cell among the one or more cells when a beam failure is detected, wherein the beam failure recovery configuration indicates the second network device to perform, based on reception of a beam failure recovery media access control (MAC) control element (CE), an inter cell beam management through the cell other than the serving cell in case of beam failure recovery, wherein the serving cell is a cell by which the terminal device is served and belongs to the second network device;

determine a layer 1/layer 2 triggered mobility (LTM) configuration for the one or more cells, the LTM configuration for the one or more cells comprises a contention free random access configuration for the one or more cells, wherein the beam failure recovery configuration further indicates the terminal device to perform the beam failure recovery to a cell other than the serving cell using a LTM configuration for the cell other than the serving cell in case of detecting the beam failure based on the contention free random access configuration;

transmit the RRC reconfiguration;

the terminal device comprising a second processor; and a second memory storing second instructions that, when executed by the second processor, cause the terminal device at least to:

receive the RRC reconfiguration for the one or more cells prepared by a first network device;

detect a beam failure; and based on the beam failure recovery configuration, initiate a beam failure recovery procedure towards the cell other than the serving cell among the one or more cells the LTM configuration;

access the cell other than the serving cell based on the contention free random access configuration;

transmit, to a node providing the cell other than the serving cell, a contention free random access preamble using the LTM configuration for the cell other than the serving cell; and transmit, to the node providing the cell other than the serving cell, the RRC reconfiguration complete message comprising the indication of the beam failure recovery.

2. The system of claim 1, wherein the beam failure recovery configuration indicates the terminal device to:

transmit, to the second network device, a contention free random access preamble; and transmit, to the second network device, the beam failure recovery MAC CE.

3. The system of claim 2, wherein the first network device is further caused to:

receive, from a node providing the cell other than the serving cell, a RRC reconfiguration complete message comprising an indication of the beam failure recovery; and perform, based on reception of the indication of the beam failure recovery, a cell switch.

4. The system of claim 3, wherein the beam failure recovery configuration indicates the terminal device to:

transmit, to a node providing the cell other than the serving cell, a contention free random access preamble using the LTM configuration for the cell other than the serving cell; and transmit, to the node providing the cell other than the serving cell, the RRC reconfiguration complete message comprising the indication of the beam failure recovery.

5. The system of claim 4, wherein the beam failure recovery configuration indicates the terminal device to:

transmit, to the node providing the cell other than the serving cell, a contention based random access preamble using the LTM configuration for the cell other than the serving cell; and transmit, to the node providing the cell other than the serving cell, the RRC reconfiguration complete message comprising the indication of the beam failure recovery.

6. The system of claim 5, wherein the RRC reconfiguration complete message further comprises an identifier of the terminal device.

7. The system of claim 6, wherein the beam failure recovery configuration indicates the terminal device to transmit, to the node providing the cell other than the serving cell, the RRC reconfiguration complete message comprising the indication of the beam failure recovery based on obtaining of a timing advance of the terminal device.

8. The system of claim 7, wherein:

the first network device comprises a central unit of a base station; and the second network device comprises a distributed unit of the base station.

9. The system of claim 8, wherein the second network device comprises:

third processor; and third memory storing instructions that, when executed by the third processor, cause the second network device at least to:

receive, from the first network device, the RRC reconfiguration for the one or more cells prepared by the first network device; and transmit, to the terminal device, the RRC reconfiguration.

10. The system of claim 9, wherein the second network device is further caused to:

perform, based on reception of the beam failure recovery MAC CE, an inter cell beam management through the cell other than the serving cell in case of beam failure recovery.

11. The system of claim 10, wherein the second network device is further caused to:

receive, from the terminal device, the contention free random access preamble, and receive, from the terminal device, the beam failure recovery MAC CE.

12. The system of claim 11, wherein the second network device is further caused to:

receive, from the first network device, the terminal device context modification request; and transmit, to the first network device, the terminal device context modification response comprising the beam failure recovery configuration for performing the beam failure recovery to the cell other than the serving cell.

13. A system comprising:

a terminal device; and first network device;

the first network device comprising:

a first processor;

a first memory storing first instructions that, when executed by the first processor, cause the first network device at least to:

transmit, to a second network device, a terminal device context modification request;

receive, from the second network device, a terminal device context modification response comprising a beam failure recovery configuration for performing a beam failure recovery to one or more cells other than a serving cell; and based on the received terminal device context modification response, determine a radio resource control (RRC) reconfiguration for the one or more cells prepared by the first network device, wherein the RRC reconfiguration comprises a beam failure recovery configuration to be used by the terminal device for performing a beam failure recovery to the one or more cells, the beam failure recovery configuration indicates the terminal device to initiate a beam failure recovery procedure towards a cell other than a serving cell among the one or more cells when a beam failure is detected, wherein the beam failure recovery configuration indicates the second network device to perform, based on reception of a beam failure recovery media access control (MAC) control element (CE), an inter cell beam management through the cell other than the serving cell in case of beam failure recovery, wherein the serving cell is a cell by which the terminal device is served and belongs to the second network device;

determine a layer 1/layer 2 triggered mobility (LTM) configuration for the one or more cells, the LTM configuration for the one or more cells comprises a contention free random access configuration for the one or more cells, wherein the beam failure recovery configuration further indicates the terminal device to perform the beam failure recovery to a cell other than the serving cell using a LTM configuration for the cell other than the serving cell in case of detecting the beam failure based on the contention free random access configuration;

transmit the RRC reconfiguration;

the terminal device comprising a second processor; and a second memory storing second instructions that, when executed by the second processor, cause the terminal device at least to:

receive the RRC reconfiguration for the one or more cells prepared by a first network device;

detect a beam failure; and based on the beam failure recovery configuration, initiate a beam failure recovery procedure towards the cell other than the serving cell among the one or more cells the LTM configuration;

access the cell other than the serving cell based on the contention free random access configuration;

transmit, to a node providing the cell other than the serving cell, a contention free random access preamble using the LTM configuration for the cell other than the serving cell; and transmit, to the node providing the cell other than the serving cell, the RRC reconfiguration complete message comprising the indication of the beam failure recovery.

14. The system of claim 13, wherein the beam failure recovery configuration indicates the terminal device to:

transmit, to the second network device, a contention free random access preamble; and transmit, to the second network device, the beam failure recovery MAC CE.

15. The system of claim 14, wherein the first network device is further caused to:

receive, from a node providing the cell other than the serving cell, a RRC reconfiguration complete message comprising an indication of the beam failure recovery; and perform, based on reception of the indication of the beam failure recovery, a cell switch.

16. The system of claim 15, wherein the beam failure recovery configuration indicates the terminal device to:

transmit, to a node providing the cell other than the serving cell, a contention free random access preamble using the LTM configuration for the cell other than the serving cell; and transmit, to the node providing the cell other than the serving cell, the RRC reconfiguration complete message comprising the indication of the beam failure recovery.

17. The system of claim 16, wherein the beam failure recovery configuration indicates the terminal device to:

transmit, to the node providing the cell other than the serving cell, a contention based random access preamble using the LTM configuration for the cell other than the serving cell; and transmit, to the node providing the cell other than the serving cell, the RRC reconfiguration complete message comprising the indication of the beam failure recovery.

18. The system of claim 17, wherein the RRC reconfiguration complete message further comprises an identifier of the terminal device.

19. The system of claim 18, wherein the beam failure recovery configuration indicates the terminal device to transmit, to the node providing the cell other than the serving cell, the RRC reconfiguration complete message comprising the indication of the beam failure recovery based on obtaining of a timing advance of the terminal device.

20. A system comprising:

first device; and a second device;

the first device comprising:

a first processor;

a first memory storing first instructions that, when executed by the first processor, cause the first device at least to:

transmit, to a third device, a terminal device context modification request;

receive, from the third device, a terminal device context modification response comprising a beam failure recovery configuration for performing a beam failure recovery to one or more cells other than a serving cell; and based on the received terminal device context modification response, determine a radio resource control (RRC) reconfiguration for the one or more cells prepared by the first device, wherein the RRC reconfiguration comprises a beam failure recovery configuration to be used by the terminal device for performing a beam failure recovery to the one or more cells, the beam failure recovery configuration indicates the terminal device to initiate a beam failure recovery procedure towards a cell other than a serving cell among the one or more cells when a beam failure is detected, wherein the beam failure recovery configuration indicates the third device to perform, based on reception of a beam failure recovery media access control (MAC) control element (CE), an inter cell beam management through the cell other than the serving cell in case of beam failure recovery, wherein the serving cell is a cell by which the terminal device is served and belongs to the third device;

determine a layer 1/layer 2 triggered mobility (LTM) configuration for the one or more cells, the LTM configuration for the one or more cells comprises a contention free random access configuration for the one or more cells, wherein the beam failure recovery configuration further indicates the terminal device to perform the beam failure recovery to a cell other than the serving cell using a LTM configuration for the cell other than the serving cell in case of detecting the beam failure based on the contention free random access configuration;

transmit the RRC reconfiguration;

the second device comprising a second processor; and a second memory storing second instructions that, when executed by the second processor, cause the second device at least to:

receive the RRC reconfiguration for the one or more cells prepared by a first device;

detect a beam failure; and based on the beam failure recovery configuration, initiate a beam failure recovery procedure towards the cell other than the serving cell among the one or more cells the LTM configuration;

access the cell other than the serving cell based on the contention free random access configuration;

transmit, to a node providing the cell other than the serving cell, a contention free random access preamble using the LTM configuration for the cell other than the serving cell; and transmit, to the node providing the cell other than the serving cell, the RRC reconfiguration complete message comprising the indication of the beam failure recovery.

* * * * *